Nov. 11, 1924.    1,514,853
C. O. HAASE
WIRE OR THREAD WHIPPING MECHANISM
Filed June 7, 1923    3 Sheets-Sheet 1

Inventor
Carl C. Haase
by H. A. Patterson
Atty.

Nov. 11, 1924. 1,514,853
C. O. HAASE
WIRE OR THREAD WHIPPING MECHANISM
Filed June 7, 1923 3 Sheets-Sheet 2

Inventor
Carl O. Haase
by H.O.Pattison
Atty.

Nov. 11, 1924.  
C. O. HAASE  
1,514,853  
WIRE OR THREAD WHIPPING MECHANISM  
Filed June 7, 1923  3 Sheets-Sheet 3
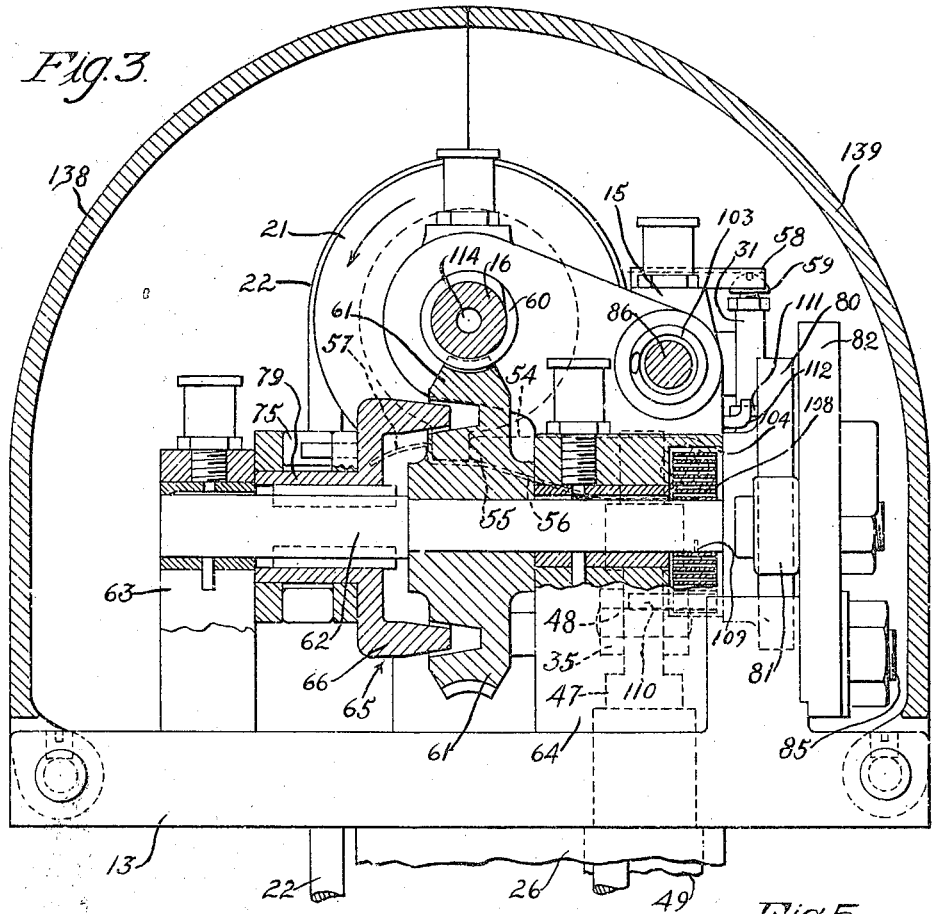
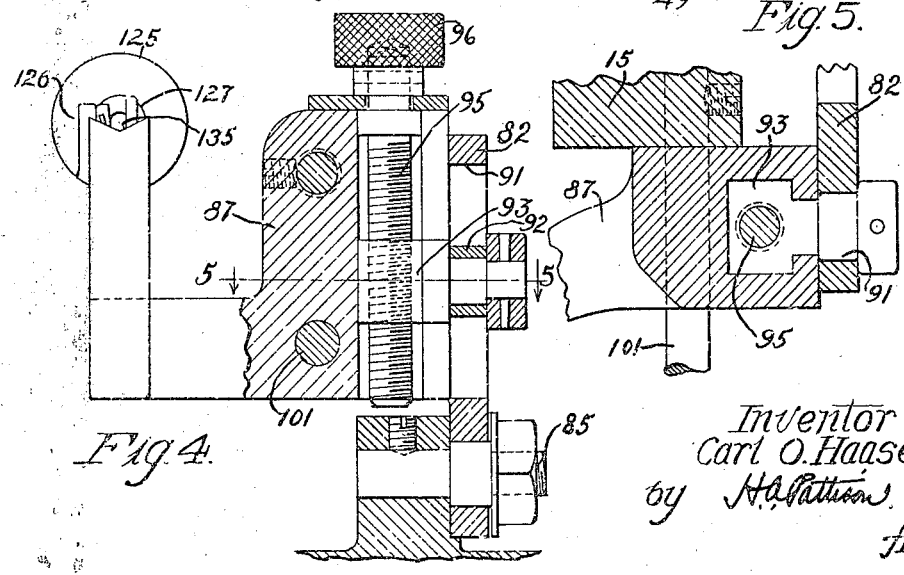
Inventor  
Carl O. Haase Patented Nov. 11, 1924.

1,514,853

UNITED STATES PATENT OFFICE.

CARL ODENWALD HAASE, OF CHICAGO, ILLINOIS, ASSIGNOR TO WESTERN ELECTRIC COMPANY, INCORPORATED, OF NEW YORK, N. Y., A CORPORATION OF NEW YORK.

WIRE OR THREAD WHIPPING MECHANISM.

Application filed June 7, 1923. Serial No. 643,864.

*To all whom it may concern:*

Be it known that I, CARL ODENWALD HAASE, a citizen of the United States, residing at Chicago, in the county of Cook and State of Illinois, have invented certain new and useful Improvements in Wire or Thread Whipping Mechanism, of which the following is a full, clear, concise, and exact description.

The subject-matter of this application is disclosed in the application of H. H. C. Grondahl and B. E. Balduf, Serial No. 514,180, filed November 10, 1921.

This invention relates to wire or thread whipping mechanism, and more particularly to a mechanism for whipping the ends of telephone cords with wire preparatory to securing terminals thereto.

The object of the invention is to provide a mechanism whereby the ends of cords may be whipped with wire with speed and accuracy and with a minimum of manual labor.

In accordance with the general features of this invention, there is provided a whipping device which draws the wire guided from a supply source and whips it about the end of a cord which is carried upon a support which is automatically stepped back the desired distance for each turn of wire whipped onto the cord. Means are also provided for varying the speed with which the cord support is stepped back during an operation of the mechanism so that various diameter wires may be whipped in closed or open formation with the same mechanism, and also for returning the operating parts of the mechanism to their starting position after an operation. The cord support is equipped with means whereby a loop may be formed in the end of the wire and held during the whipping operation, the loop thereafter being drawn taut for locking the end of the wire under the whipping.

The whipping device is provided with a severing surface to cut off the excess wire after the threading operation is completed and before the whipping operation. The wire is drawn over the severing surface after it is passed around the loop forming means.

In the drawings illustrating the invention:

Fig. 3 is a vertical section taken on the line 3—3 of Fig. 2;

Fig. 4 is a fragmentary detail front elevation partly in section;

Fig. 5 is a plan section upon the line 5—5 thereof;

Fig. 6 is an enlarged fragmentary plan view of the whipping finger and the cord support with the wire threaded and the cord indicated in position ready to have an end whipped;

Fig. 7 is a view of the cord with an end whipped with wire and after removal from the mechanism, and Fig. 8 is a view thereof in a finished condition.

Figure 1:
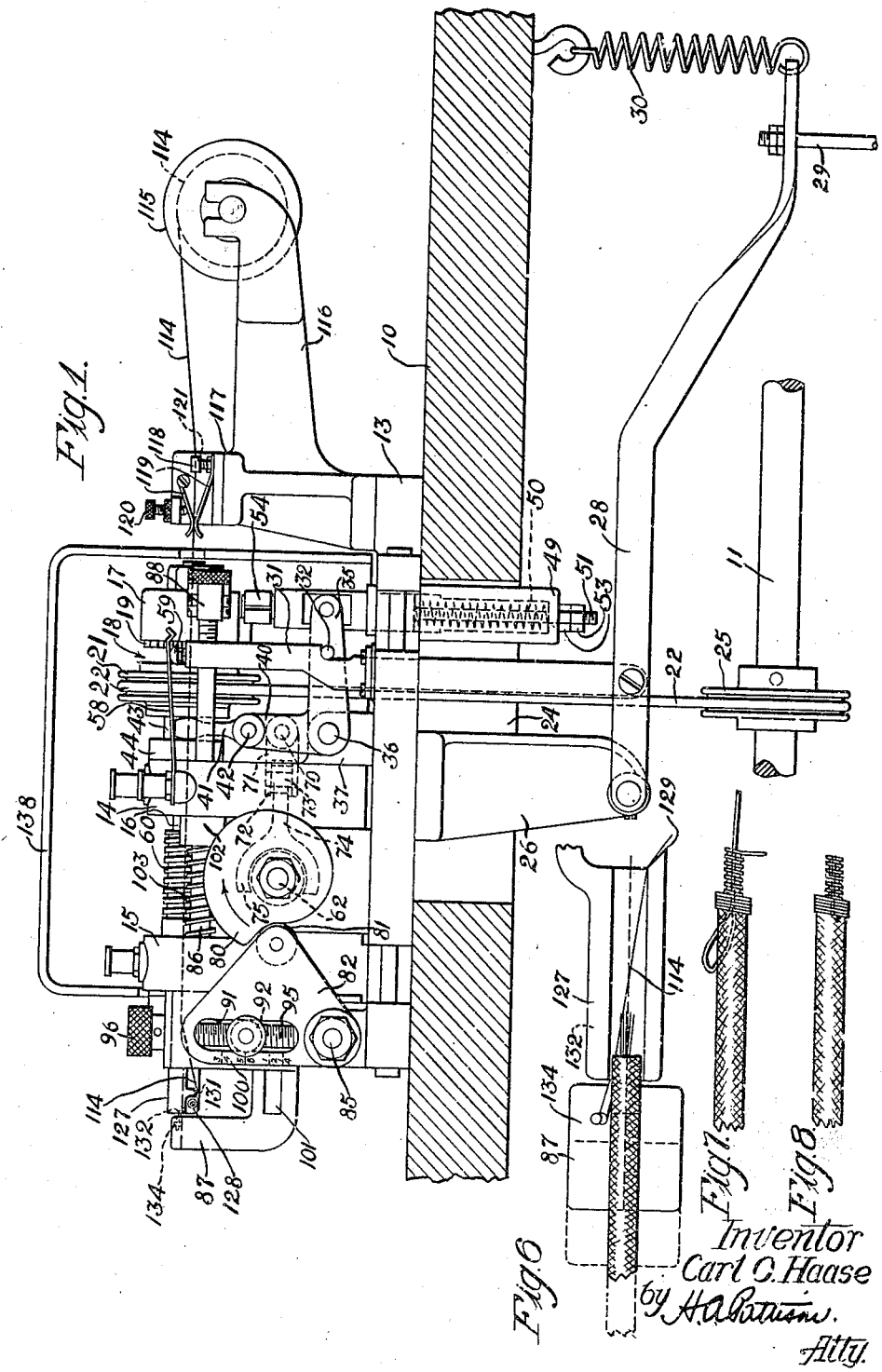
Fig. 1 is a side elevation of the complete mechanism with a section of the cover removed.

As shown in Fig. 1, the machine is supported upon a bench or table 10 with the main driving shaft 11 positioned below, which may be connected to any suitable driving means (not shown). Carried upon a frame 13 and rotatably mounted in bearings 14 and 15 thereon is a hollow shaft 16. Secured to one end of the shaft 16 is a friction ring 17 which forms the driven part of a clutch 18, the engaging face of which is preferably provided with cork inserts indicated at 19. Slidable longitudinally upon the shaft 16 and free to rotate thereon is a pulley 21 which forms the driving part of the clutch 18 and is connected by a belt 22 passing through an opening 24 in the bench 10 to a similar pulley 25 secured upon the main driving shaft 11.

Figure 2:
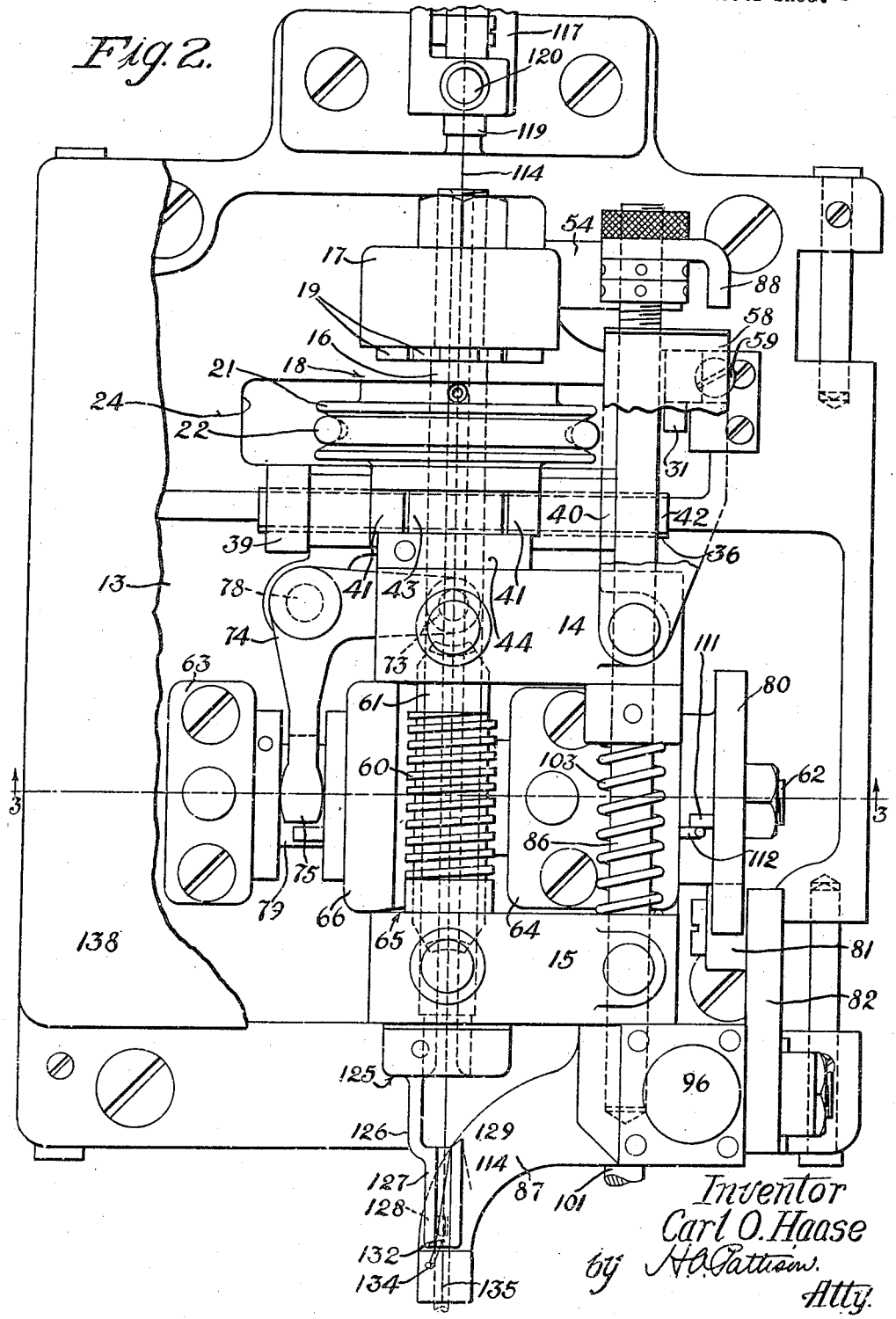
Fig. 2 is an enlarged fragmentary plan view thereof.

Pivotally secured at one end to a bracket 26 secured to the underside of the bench 10 is a lever 28 the opposite end of which is connected to a suitable foot treadle or other operating means (not shown) by a link 29. A spring 30, one end secured to the bench and its other end to the lever 28, functions to return the lever 28 to its normal position after each operation thereof. A latch 31 pivotally secured at one end to the lever 28 and passing upward through the opening 24 in the bench engages a pin 32 secured to a bell-crank lever 35 secured to one end of a pin 36 which is rotatably mounted in bearings 37 upon the frame 13. The pin 36 at its other end carries an arm 39 (see Fig. 2) which is the same length as the short arm 40 of the lever 35. Positioned between the short arm 40 of the lever 35 and the arm 39 and at their upper ends is a yoke member 41 carried loosely upon a pin 42 secured at either end to the upper ends of the arms 39 and 40. The yoke member 41 straddles a sleeve portion 43 of the pulley 21, at the end of which is secured a collar 44. The long arm of the bell-crank lever 35 is fork shaped at its end and is pivotally secured to a movable post 47 by a pin 48 (see Figs. 1 and 3).

The post 47 in its movement is guided in a cup-like member 49 suitably secured to the frame 13. Carried within the cup 49 between the inside lower surface and a shoulder formed on the post 47 is a spring 50. A reduced end 51 of the post 47 extends through the cup 49 and has threaded thereon a set of adjusting nuts 53. Clamped to the upper end of the post 47 is a stop arm 54 which extends inwardly toward the axis of the shaft 16 and engages a lug 55 formed on the peripheral surface of the friction ring 17. (See Figs. 1 and 3.) A leaf spring 56 secured to the under side of the stop arm 54 is shaped at its free end to allow the lug 55 on the ring 17 to be locked behind a shoulder 57 formed on the spring 56 and the end of the stop arm 54. The function of the stop arm 54 and the spring 56 carried thereby is to stop the friction ring 17 and the shaft 16 secured thereto in the same position after each operation. A leaf spring 58 bearing against an adjustable screw 59 secured in the end of the latch 31 functions to hold the latch in locking engagement with the pin 32 in the lever 35 when the mechanism is in its initial position, as shown in the drawings.

Formed upon the shaft 16 intermediate the bearings 14 and 15 is a worm 60 which meshes with a worm wheel 61 loosely carried upon a shaft 62 positioned below the shaft 16 and rotatable in the bearings or supports 63 and 64. The worm wheel 61 forms the driving part of the clutch 65 and is adapted to be engaged by a driven member 66 secured to the shaft 62, but slidable thereon (see Fig. 3). Pivotally secured to a fork formed upon the yoke member 41 directly below the shaft 16 by a pin 70 is a link 71 (see Fig. 1). The link 71 is forked at its other end as indicated at 72 and has pivoted thereon by a pin 73 a bell-crank lever 74 which at its other end 75 is yoke shaped. The bell-crank lever 74 is pivoted at 78 to the frame 13 and its yoked end 75 straddles a sleeve portion 79 integral with the driving member 66 and positioned between collars suitably secured thereon. Upon one end of the shaft 62 is secured a distributing cam 80 which is engaged by a cam roller 81 carried upon an arm 82 pivoted at 85 to a lug extending up from the base of the frame 13 (see Fig. 4). Slidable in the supports 14 and 15 and to one side of the shaft 62 is a guide rod 86 which has secured at one end a conductor support 87 and at its other end a striker 88 which in the operation of the machine strikes the latch 31 after the conductor support 87 has moved back the desired amount. The movement of the striker 88 against the latch 31 disengages it from the pin 32 in the bell-crank lever 35 and through the spring 50 the long arm of the lever 35 is moved upward, which movement through the associated arms, link and lever disengages the clutches 18 and 65, thereby stopping the machine. The striker 88 is adjustably mounted upon the guide rod 86, so that the length of whipping put on conductors may be varied as desired.

The distributing cam 80 is provided with a slot 91 in line with its pivot 85, within which rides a roller 92 suitably supported from an adjusting nut 93 adjustable vertically in a guideway 94 formed in the conductor support 87 by an adjusting screw 95. The screw 95 is supported in the guide-way 94 to prevent its movement vertically (see Fig. 4) and is equipped with a head 96 for turning it. The speed of the conductor support 87 in moving rearward can be varied, and consequently the number of turns of wire whipped onto the conductor in an operation will be varied, by moving the roller 92 up or down in the slot 91. The movement of the arm 82 is the same at all times, but it will be readily seen that by increasing the distance between the axis of the roller 92 and the pivot 85 of the arm 82 the speed of the support 87 in moving rearward will be increased and vice versa. A suitable scale 100 is marked upon the arm 82 to assist the operator in setting the roller 92 in the slot 91 so that the support will move at the desired speed. Secured in the support 15 is a guide pin 101 upon which the conductor support is moved and guided in its movement. Surrounding the guide rod 86 between the support 15 and a collar 102 secured upon the rod 86 and resting against the support 14 is a compression spring 103 which functions to return the conductor support 87 to its initial position after each operation. The support 15 is hollowed out as indicated at 104 (see Fig. 3) and within it is housed a clock spring 108 which is coiled around the shaft 62 with one end secured thereto as shown at 109 and its other end fastened to a pin 110 secured in the support 15. The purpose of the spring 108 is to return the cam 80 to its normal position any time the clutch 65 is disengaged by the striker 88 engaging the latch 31, as before described, which engagement always happens before the cam 80 has made a complete revolution, thereby preventing any damage to the machine. A pin 111 carried by the cam 80 engages a stationary stop 112 upon the return movement of the cam 80, thereby causing the cam to be brought to a stop in the same position after each operation.

A supply of wire 114 to be whipped around the ends of the conductor is carried on a spool 115 freely rotatable upon a bracket 116 secured to the rear end of the frame 113. Mounted upon a platform 117 forming part of the bracket 116 is an adjustable guide pin 118 provided with an opening 121 through which the wire is guided. The opening 121 in the guide pin 118 is in line with the axis of the hollow shaft 16 through which the wire is threaded. A pair of spring tension fingers 119 engages the wire 114 upon opposite sides thereof after leaving the guide pin 118 to put a certain tension upon the wire as it is drawn from the supply spool. A thumb screw 120 is provided to center the fingers in line with the opening in the guide pin 118 and the opening through the shaft 16.

To that end of shaft 16 which projects outside of the bearing 63 is secured a whipping head 125. As shown in the drawings, the mechanism is in its normal position with the head 125 brought to a standstill after an operation by the engagement of the lug 55 with the stop arm 54. Formed on the whipping head 125 is a whipping finger 126 which extends forward of the whipping head 125 and has an end 127 substantially U-shaped in cross section and the hollow of which is coincident with the axis of the shaft 16. Mounted upon the whipping finger 126 below the U-shaped section and a trifle to one side of the axial line of the shaft 16 is a roller 128 (see Figs. 1 and 2). The inside end of one side of the whipping finger 126 is shaped as indicated at 129 to form a knife edge, the purpose of which will be described in the description of the operation of the machine. Passages 131 and 132 are formed in the whipping finger 126 in line with the roller 128 for the passage of the wire 114 before reaching and after leaving the roller 128.

Suitably pivoted to the frame 13 are the cover members 138 and 139 which serve to enclose the greater part of the mechanism.

The operation of this mechanism is as follows:

In the drawings the mechanism is shown in its normal position with the wire threaded from the supply spool through the hollow shaft 16 and the passages 131 and 132 in the whipping finger 126 and the guide roller 128 carried thereon and then looped around a pin 134 in the conductor support 87 and then over the knife edge 129 on the whipping finger 126. By passing the wire over the knife edge after it is looped around the pin 134 and exerting a slight pull on it the surplus wire may be cut off. The conductor support 87 is provided with a V-shaped depression 135 in its top surface within which the end of the conductor to be whipped is placed with its end projecting a suitable distance into the U-shaped formation of the whipping finger 126. Upon a depression of the foot treadle the friction ring 17 of the clutch 18 is freed from the retaining spring 50 and immediately thereafter the driving member 21 of the clutch 18 is moved into engagement with the friction ring 17.

Immediately after the clutch 18 is engaged the clutch 65 is also engaged and the cam 80 is set in motion in the direction indicated by the arrow in Fig. 1. The whipping finger 126 being carried by the shaft 16, it is set in motion upon the engagement of the clutch 18 and as the cam 80 moves the conductor support 87 with the conductor thereon rearward, the whipping finger 126 wraps the wire around the end of the conductor in a spiral formation. The striker 88, being adjusted on the rod 86 the proper distance from the latch 31 so as to disengage it from the pin 32 on the bell-crank lever 35 when the conductor support 87 has moved the desired distance rearward, comes into engagement with the latch 31 and frees it from the pin 32. This causes the long arm of the bell-crank lever 35 to move upward, due to the spring 50, and thereby disengages the clutches 18 and 65, bringing the shafts 16 and 62 to a standstill.

The clock spring 108 secured to the shaft 62 functions to return the cam 80 to its initial position against the stop 112 upon the disengagement of the clutch 65. The stop arm 54 and the spring 56 carried thereby upon the movement upward of the post 47 when the latch 31 is disengaged act to stop the shaft 16 and the whipping head and finger carried thereon in their initial position, as shown in the drawings, with the whipping finger 126 in an up position ready for the insertion of the end of the next conductor to be whipped. Upon the disengagement of the latch 31 and the pin 32 the operator releases the foot treadle which allows the spring 30 to move the lever 28 and the latch 31 secured thereto to their normal position.

Upon the stopping of the mechanism the operator picks up the conductor from the whipping finger, which operation draws a short length of wire from the supply spool and cuts it off close to the whipped end, as shown in Fig. 7. To finish the whipped end of the conductor the ends of the whipped wire are cut off, as shown in Fig. 8. The short length of wire extending from the whipped finger 126 after an operation is looped around the pin 134 and then over the knife edge 129 and then cut off ready for the following operation.

What is claimed is:

1. In a mechanism for whipping the ends of cords with wire, means for whipping the wire about the end of the cord, a support for the cord adapted to be stepped back during the whipping operation to cause the wire to be whipped about the cord in a spiral formation, and means mounted angularly upon said support for forming a loop in the end of the wire and holding it during the whipping operation.

2. In a mechanism for whipping the ends of cords with wire, means for whipping the wire about the end of the cord, comprising a revolvable finger, said finger being provided with a surface adapted while in its initial position to sever any excess wire after the threading operation is completed by drawing the wire thereover, and a support for the cord adapted to be stepped back during the whipping operation.

3. In a mechanism for whipping a core with a strand, means for whipping the strand around said core, a support for the core, means for causing relative movement between the core and whipping means to cause the strand to be whipped around the core in a spiral formation, means associated with said support whereby a loop may be formed in the end of the strand, and automatic means for establishing the original relation between said support and the whipping means.

4. In a mechanism for whipping a core with a strand, means for whipping the strand around the core comprising a revolvable member, means associated with said member adapted to sever any excess strand after a threading operation is completed by drawing the thread thereover, a support for the core, and means for causing relative movement between the support and said whipping means.

5. In a mechanism for whipping the ends of cords with a strand, means for whipping the strand around the end of the cord, a support for the cord adapted to be stepped back during the whipping operation to cause the strand to be whipped around the cord in a spiral formation, means associated with said support whereby a loop may be formed in the end of the strand, and means for automatically returning said supporting means to its starting position after a whipping operation.

6. In a mechanism for whipping the ends of a cord with a strand, means for whipping the strand around the cord comprising a revolvable finger, means associated with said finger adapted to sever any excess strand after a threading operation is completed by drawing the thread thereover, and a support for the cord adapted to be stepped back during the whipping operation.

7. In a machine for whipping the end of a core with a strand, means for whipping the strand around the end of the core, a support for the core, means for causing relative movement between said support and the whipping means to cause the strand to be whipped around the core in a spiral formation, means for holding the end of said strand in fixed relation to said core, and means for establishing the original relation between the support and the whipping means.

8. In a machine for whipping the end of a core with a strand, means for whipping the strand around the end of the core, a support for the core, means for causing relative movement between said support and the whipping means to cause the strand to be whipped around the core in a spiral formaton, means for holding the end of said strand in fixed relation to said core, means for establishing the original relation between the support and the whipping means, and mechanism controlled by one of said means for causing an actuation of said last-mentioned means.

9. In a machine for whipping the end of a core with a strand, means for whipping the strand around the end of the core, a support for the core, means for causing relative movement between said support and the whipping means to cause the strand to be whipped around the core in a spiral formation, means for holding the end of said strand in fixed reation to said core, and means for returning said whipping means to its starting position after a whipping operation.

10. In a machine for whippng the end of a core with a strand, means for whipping the strand around the end of the core, a support for the core, means for causing relative movement between said support and the whipping means to cause the strand to be whipped around the core in a spiral formation, means for holding the end of said strand in fixed relation to said core, means for establishing the original relation between the strand and the whipping means, mechanism controlled by one of said means for causing an actuation of said last-mentioned means, and means for returning said whipping means to its starting position after a whipping operation.

11. In a mechanism for whipping the end of a core with a strand, means for whipping the strand around the end of the core, a support for the core, means for causing relative movement between said support and the whipping means to cause the wire to be whipped around the core in a spiral formation, means for forming a loop in the end of the strand, and means for returning said whipping means to its starting position after the whipping operation.

12. In a mechanism for whipping the end of a core with a strand, means for whipping the strand around the end of the core, a support for the core, means for causing relative movement between said support and the whipping means to cause the wire to be whipped around the core in a spiral formation, means for forming a loop in the end of the strand and holding said loop in fixed relation to said core, means for returning said whipping means to its starting position after the whipping operation.

13. In a mechanism for whipping the end of a core with a strand, means for whipping the strand around the end of the core, a support for the core, means for causing relative movement between said support and the whipping means to cause the wire to be whipped around the core in a spiral formation, means for forming a loop in the end of the strand, means for establishing the original relation between the support and the whipping means, and mechanism controlled by one of said means for causing an actuation of said last-mentioned means.

14. In a mechanism for whipping the end of a core with a strand, means for whipping the strand around the end of the core, a support for the core, means for causing relative movement between said support and the whipping means to cause the wire to be whipped around the core in a spiral formation, means for forming a loop in the end of the strand and holding said loop in fixed relation to said core, means for returning said whipping means to its starting position, means for establishing the original relation between the support and the whipping means, and mechanism controlled by one of said means for causing an actuation of said last-mentioned means.

15. In a mechanism for whipping a core with a strand, means for whipping the strand around said core, a support for the core, means for causing relative movement between the core and whipping means to cause the strand to be whipped around the core in a spiral formation, means associated with said support whereby a loop may be formed in the end of the strand, said means comprising a projection carried by said support, and means for returning said whipping means to its starting position after the whipping operation.

16. In a mechanism for whipping the ends of cords with wire, means for whipping the wire about the end of the cord, a support for the cord adapted to be stepped back during the whipping operation to cause the wire to be whipped about the cord in a spiral formation, and a pin mounted angularly upon said support for forming a loop in the end of the wire and holding it during the whipping operation.

17. In a mechanism for whipping the end of a core with a strand, means for whipping the strand around the end of the core comprising a rotatable element, said element being provided with a surface adapted to sever any excess strand after the whipping operation is completed by drawing the strand thereover.

18. In a mechanism for whipping the ends of cords with wire, means for whipping the wire around the end of the cord comprising a rotatable element, said element being provided with a surface adapted to sever any excess wire after the whipping operation is completed by drawing the wire thereover, and means for returning said whipping means to its starting position after the whipping operation.

19. In a mechanism for whipping a core with a strand, means for whipping the strand around said core, a support for the core, means for causing relative movement between the core and whipping means to cause the strand to be whipped around the core in a spiral formation, means for holding the end of said strand in fixed relation to said core and said whipping means being provided with a surface adapted while in its initial position to sever any excess wire after the whipping operation is completed by drawing the wire thereover.

20. In a mechanism for whipping the ends of cords with wire, means for whipping the wire around the end of the cord comprising a rotatable element, said element being provided with a surface adapted to sever any excess wire after the whipping operation is completed by drawing the wire thereover, a support for the cord, means for causing relative movement between the support and said whipping means to cause the wire to be whipped around the cord in a spiral formation, and means for holding the end of said wire in fixed relation to said insulated wire.

21. In a mechanism for whipping the ends of cords with wire, means for whipping the wire around the end of the cord comprising a rotatable element, said element being provided with a surface adapted to sever any excess wire after the whipping operation is completed by drawing the wire thereover, a support for the cord adapted to be stepped back during the whipping operation, and means carried by said support for forming a loop in the end of the wire and holding it during the whipping operation.

In witness whereof, I hereunto subscribe my name this second day of June A. D., 1923.

CARL ODENWALD HAASE.